July 17, 1934. J. C. BLACK Re. 19,237
DIGESTER FOR CRACKING HYDROCARBON OILS
Original Filed Oct. 25, 1922
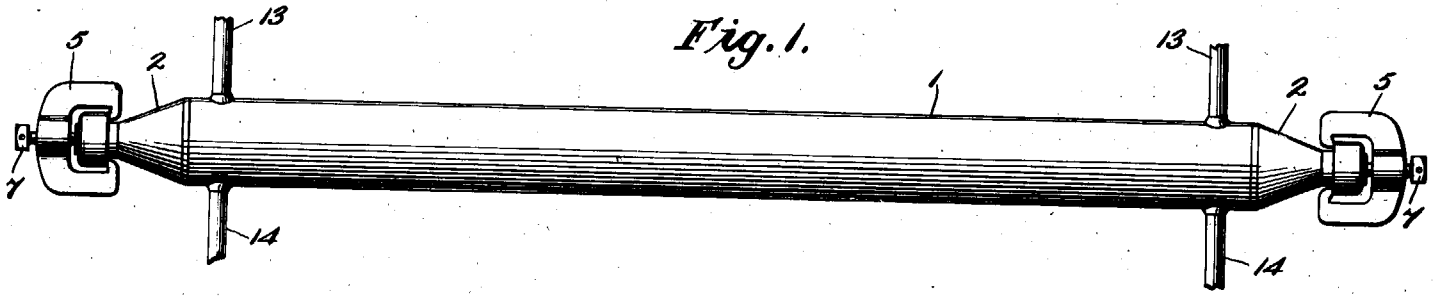
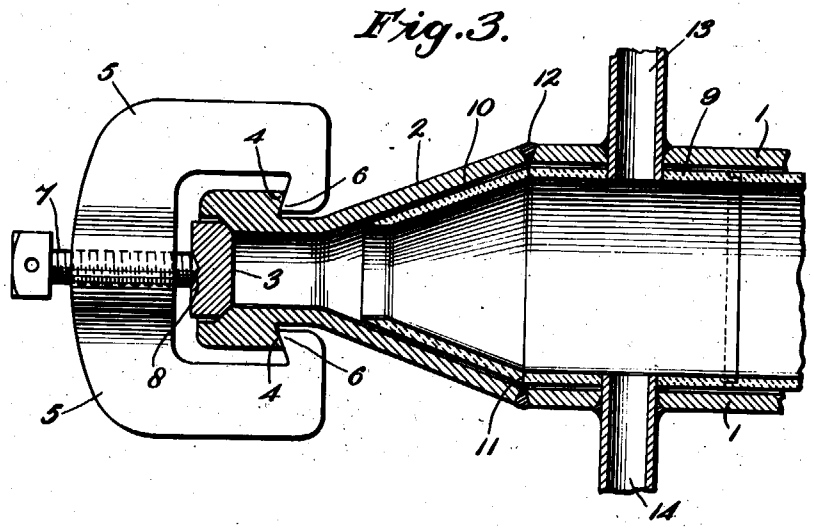
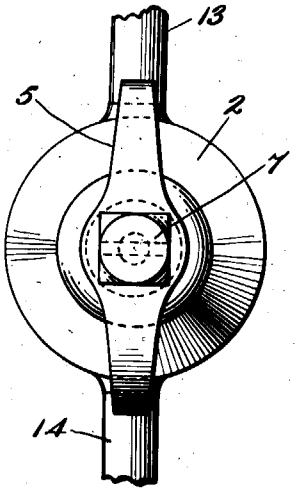
Inventor
John C. Black
By by J. S. Newton
Attorney Reissued July 17, 1934 Re. 19,237

UNITED STATES PATENT OFFICE 19,237

DIGESTER FOR CRACKING HYDROCARBON OILS

John C. Black, Los Angeles, Calif., assignor, by mesne assignments, to Gasoline Products Company, Inc., Wilmington, Del., a corporation of Delaware Original No. 1,815,428, dated July 21, 1931, Serial No. 596,837, October 25, 1922. Renewed September 6, 1927. Application for reissue October 19, 1932, Serial No. 638,633

9 Claims. (Cl. 196—133)

This invention relates to a digester to be used in an apparatus for converting high boiling point hydrocarbons into low boiling point hydrocarbons.

In my application for Letters Patent Serial No. 344,406, Patent No. 1,426,813 granted Aug. 22, 1922, I describe and show in more or less detail what I denominate a digester or reaction chamber. This chamber is employed to increase the decomposition of high boiling point hydrocarbons, or what is ordinarily termed the cracking of high boiling point hydrocarbons, to produce those of lower boiling points.

In my before mentioned application, I describe a process and apparatus wherein the temperature of the hydrocarbons is raised as high as 1000° F., and the hydrocarbons are passed through the apparatus under a pressure of 1000 pounds or more per square inch. Under such conditions of pressure and temperature, the digester is put under tremendous strain and the tendency of the sulphur, or sulphur compounds, due I believe to the elevated temperature, is to act upon the metal of the digester and in time becomes destructive to the apparatus.

In my present application, I show a structure of digester that will greatly prolong its life and one of the chief objects of the present invention is to protect the digester from the corrosive or destructive action of the sulphur or impurities in the oil being treated while under the very high temperature and pressure before mentioned.

With the foregoing and other objects in view which will appear as the description proceeds, the invention consists in the novel features hereinafter described in detail, illustrated in the accompanying drawing and more particularly pointed out in the appended claims.

Referring to the drawing:

Figure 1 is a view of the digester from the exterior.

Figure 2 is a view of the end of the digester at right angles to the view of Figure 1.

Figure 3 is a sectional view through the middle of one end of the digester.

My digester in its improved form consists of a metallic chamber 1, preferably tubular in shape with contracted ends, the chamber having such a diameter and thickness of metal as to withstand the high pressures and temperatures employed in my process which I conveniently denominate a liquid phase cracking process, because the hydrocarbons are kept under sufficient pressure to prevent their vaporization. The digester is preferably of a length several times that of its diameter, ordinarily as much as twenty times or even more, depending upon the conditions under which it operates.

The ends 2 of the digester are constructed to permit of the ready access to the interior of the digester through removable closures 3.

The ends 2 are made in separate castings or forgings from the main body 1 of the digester and are contracted at their outer ends to reduce the total pressure on the closures 3. This is further accomplished by flaring the interior portions of the ends and shaping the closures to fit within the flared portions as shown in Figure 3.

Shoulders 4, which are preferably undercut, are formed near the ends of the sections 2 and a yoke 5 extends over the ends of the sections 2 and has claws 6 extending behind the shoulders 4. The yoke 5 also has extending through it a screw threaded hole and a screw threaded bolt 7 extends through said hole and when the yoke is in place rests in a slight depression 8 in the closure 3 as clearly shown in Figure 3.

To prevent the action of the sulphur and other impurities in the hydrocarbons on the metal casing of the digester, I line the interior of the digester with a tubular lining 9 and the contracted portion 2 with a line 10, this lining is made of a sulphur resisting material. The ends of the sections of the linings 9 and 10 abut each other at 11 and the sections of the casing 1 and 2 are welded together at 12, or otherwise connected together.

The pipes 13 and 14 communicate with the interior of the digester and may be either screwed into the casing 1 or welded thereto as desired, the pipes extending through the digester lining.

I have found by experience that oils under high heat which carry or have in them sulphur or sulphur compounds will attack steel or iron and that the corrosive action may be prevented almost entirely by thus lining the digester with a sulphur resisting lining such as carborundum or other silicon carbon alloys, also silicon iron alloys such as duriron, calite or corrosiron, and also calorized linings or those treated with aluminum. The lining of the digester may be conveniently placed in the tube by moulding it in but preferably it should be cast in sections and the sections placed in the casing of the digester as shown in Figure 3. Calite is an alloy containing chromium together with nickel, iron and sometimes aluminum.

It is not essential that the lining sections have a tight fit when first placed in the digester as the carbon deposit from the hydrocarbons will soon fill up any cracks and will cement the lining in place and the lining will become practically integral with the outer casing. The carbon so deposited will remain in place and will not be removed by the ordinary process employed in purging the digester of accumulated carbon. This purging action being described in my application, Serial No. 569,757, for Process and apparatus for the production of low boiling hydrocarbons Patent No. 1,456,419 granted May 22, 1923.

The joint between the port or closure 3 and the casing tube is preferably a ground joint but this is not essential as a gasket may be used instead.

What I claim as new is:

1. A digester for cracking hydrocarbons at an elevated temperature and pressure comprising a metallic casing in sections, the end sections being cone-shaped, and a middle section having pipes extending through its walls and connected with its interior, the small ends of the cone-shaped sections having shoulders on their exterior and being interiorly flared, a metallic closure for each end fitting within the flared ends and having on its exterior surface an indentation, and yokes fitting behind the shoulders on the exterior of the cone-shaped ends each having a bolt screw-threaded through the yoke and extending into the indentation of the metallic closure.

2. A digester to be used in cracking hydrocarbons at high temperature and pressure comprising a solid metallic casing in three sections, a middle cylindrical section having pipes extending thereinto and welded into the solid walls of the section, conical end sections with their walls flush with and attached to the middle section, the cone-shaped sections having shoulders on their exteriors near their smaller ends and flared interiorly at their smaller ends, yokes having claws for coaction with the shoulders, metallic closures fitting within the flared ends, said yokes also have screw-threaded holes therethrough and bolts extending through the holes and pressing against the closures to hold the same closed.

3. A digester for cracking hydrocarbons under high pressure and temperature comprising a casing composed of a central cylindrical section and end cone-shaped sections, a sulphur resisting lining for the casing also composed of central cylindrical and end cone-shaped sections, whereby the central lining sections may be put in place and the end cone-shaped sections held against end-wise displacement, closures for each end of the digester, each closure being held closed by a yoke, said yokes having means attaching them to the digester, screw-threaded holes through the yokes, and bolts passed through the holes to press upon the closures and hold them to their seats.

4. A digester for use in cracking oils under high temperature and pressure comprising a metallic casing made in three sections, the two end sections having contracted end portions, the middle section being welded to the end sections, pipes extending into the digester and secured to the casing, a lining for the casing extending from end to end of the digester and into the contracted portions as described.

5. A digester for use in cracking oils at high temperature and pressure comprising a casing and having contracted ends, a sulphur resisting lining for the casing, tubes extending through the casing and the lining and communicating with the interior of the digester, the digester ends having undercut shoulders, a yoke at each end and having a hole therethrough, a closure at each end closely fitting said casing and means extended through said yokes to press the closures to their seats.

6. A digester for use in cracking hydrocarbons at high temperature and pressure comprising a sectional casing having its end sections diametrically contracted in size and having removable end closures, a lining for the casing made in sections to fit the different sized casing sections, said lining having a chemical composition capable of withstanding the action of sulphur and sulphur compounds found in hydrocarbons during decomposition in a cracking operation, said casing and lining having openings therein for ingress and egress for the products under treatment.

7. A digester for use in cracking hydrocarbons at high temperatures and pressures comprising a casing having its end sections diametrically contracted in size and provided with removable end closures, a liner for the casing made in sections to fit the different sized casing sections, said lining being composed of a chromium alloy capable of withstanding the action of sulphur and sulphur compounds rendered active in the cracking reaction of hydrocarbons, said casing and lining having openings therein for ingress and egress of the products under treatment.

8. A vessel for use in cracking hydrocarbons at high temperature comprising a casing having its end portions diametrically contracted in size and having removable end closures, a lining for the casing made in sections to fit within said casing, said lining having a chemical composition capable of withstanding the action of sulphur and sulphur compounds rendered active in the cracking reaction of hydrocarbons, said casing and lining having openings therein for ingress and egress of the products under treatment.

9. A vessel for use in cracking hydrocarbons at high temperature comprising a casing having its end portions diametrically contracted in size and having removable end closures, a lining for the casing made in sections to fit within said casing, said lining being composed of a chromium alloy capable of withstanding the action of sulphur and sulphur compounds rendered active in the cracking reaction of hydrocarbons, said casing and lining having openings therein for ingress and egress of the products under treatment.

JOHN C. BLACK.